Figure 1:
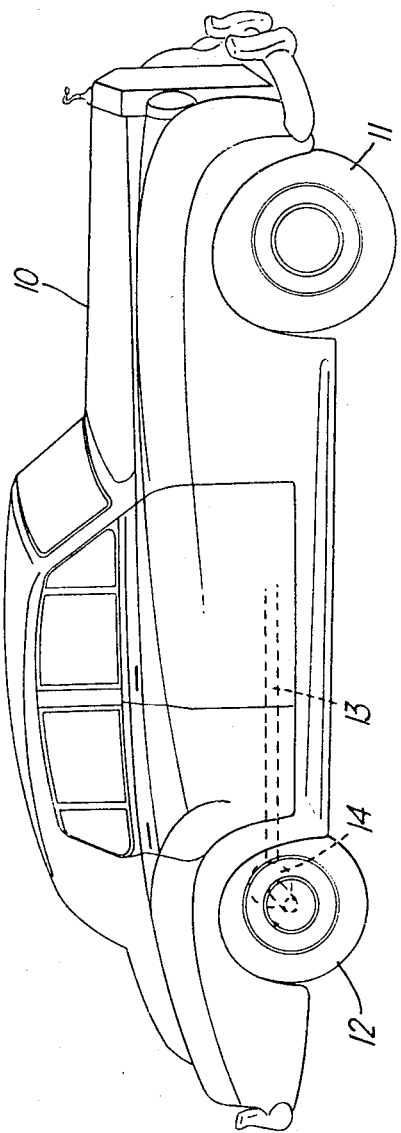

United States Patent

[11] 3,633,698

| [72] | Inventor | Jack Briggs<br>Derby, England |
|---|---|---|
| [21] | Appl. No. | 3,389 |
| [22] | Filed | Jan. 16, 1970 |
| [45] | Patented | Jan. 11, 1972 |
| [73] | Assignee | Rolls-Royce Limited<br>Derby, England |
| [32] | Priority | Feb. 6, 1969 |
| [33] | | Great Britain |
| [31] | | 6,543/69 |

[54] MOTOR VEHICLE
21 Claims, 4 Drawing Figs.

[52] U.S. Cl. .................................................. 180/10,
152/80
[51] Int. Cl. ........................................................ B60g 11/18
[50] Field of Search ........................................... 152/21, 80,
5; 301/136; 180/10

[56] References Cited
UNITED STATES PATENTS

| 2,926,047 | 2/1960 | Edwards | 180/10 X |
| 3,161,248 | 12/1964 | Edwards | 180/10 |
| 1,434,291 | 10/1922 | Kuffel | 152/80 X |

*Primary Examiner*—Philip Goodman
*Attorney*—Cushman, Darby & Cushman

ABSTRACT: The invention concerns a motor vehicle which has a suspension for the rear wheels which allows pivotal and vertical movement thereof with respect to the sprung mass.

The suspension comprises two coplanar torsion members connected between the sprung mass and each wheel so that a force applied transversely to the sprung mass causes pivotal movement of the wheels in a direction which is opposed by the action of the torsion members.

Inventor
JACK BRIGGS 3,633,698

MOTOR VEHICLE

This invention relates to motor vehicles.

According to the present invention there is provided a motor vehicle having a suspension for the rear wheels for allowing pivotal and vertical movement thereof with respect to the sprung mass of the vehicle comprising at least one torsion member connected between said sprung mass and each said rear wheel, in such a manner that a force applied transversely to the sprung mass causes pivotal movement of the wheels in a direction which is opposed by the action of the torsion members.

The or each torsion member may be connected between said sprung mass and each said wheel in such a manner that a force applied transversely to the sprung mass causes pivotal movement of the wheels in a direction and to an extent which is such as to tend to counteract said force.

The or each torsion member may be mounted in a housing comprising two relatively movable parts, the wheels being journaled in one of the parts of said housing by first bearing means which allow said wheels to rotate relative to said one part of the housing and which transmit said pivotal movement of said wheels to said one part of the housing. Thus the other part of the housing may be connected to the sprung mass by longitudinally extending trailing arms or wishbones. Preferably said trailing arms or wishbones are connected to a support member which is rigidly mounted on the sprung mass of the motor vehicle.

In the preferred embodiment the opposite ends of the or each said torsion members are connected to the two parts of the housing respectively by means of splines.

Said torsion member or members always may have a positive preapplied tension to keep said splines engaged with said housing parts.

The two parts of said housing may be supported from one another by second bearing means, said wheel being pivotal about said second bearing means.

In the preferred embodiment of the present invention two torsion members are provided extending on a common axis on opposite sides of the axis of rotation of the wheel. The common axis of said torsion members and a vertical axis extending through the axis of the wheel may be substantially coplanar and intersect at an angle between 5° and 25°.

Preferably said common axis and said vertical axis are both in the midcircumferential plane of the wheel. Said common axis may intersect the ground in advance of the said vertical axis to produce oversteer characteristics in the vehicle. Alternatively said common axis may intersect the ground in retard of the said vertical axis to produce understeer characteristics in the vehicle.

Figure 2:
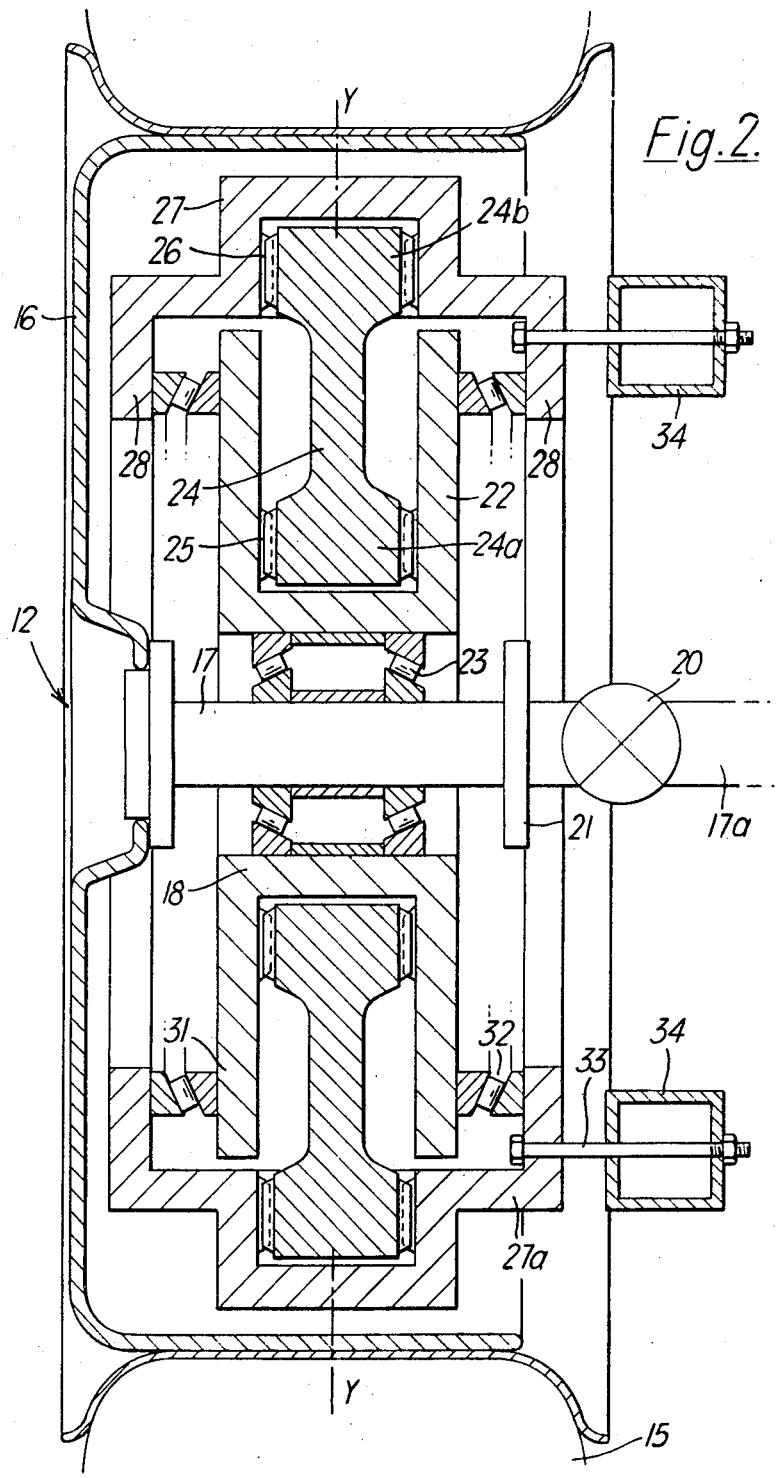
Figure 3:
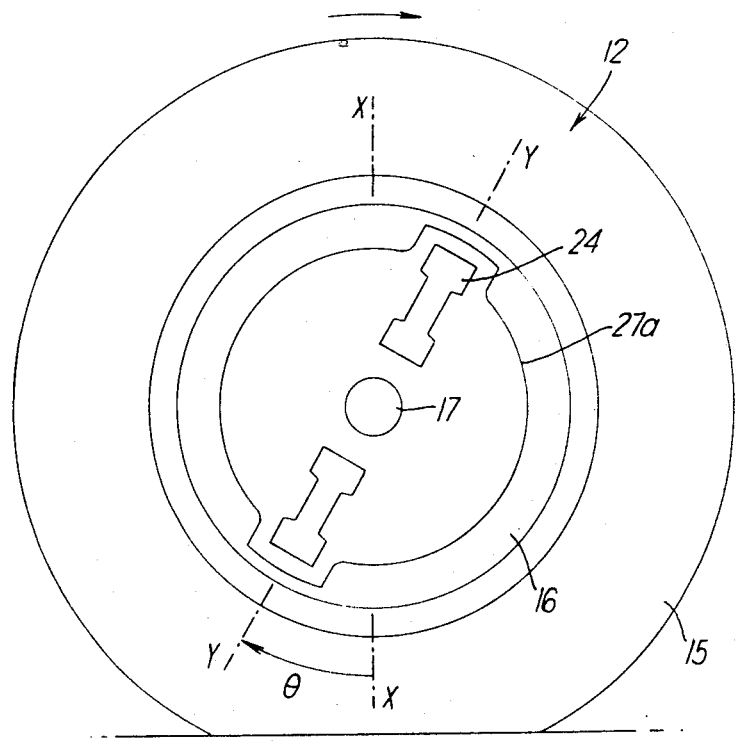
Figure 4:
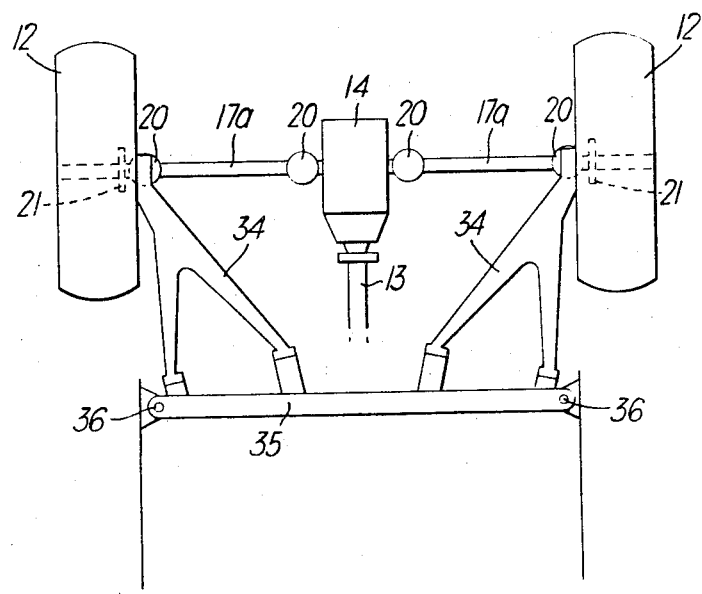

The invention will now be described, merely by way of example, with reference to the accompanying drawings, in which:

FIG. 1 is a perspective view of a motor vehicle according to the present invention, FIG. 2 is a cross section through a rear wheel of a motor vehicle according to the present invention, FIG. 3 is a side view of the wheel shown in FIG. 2, illustrating the geometry of the invention, and FIG. 4 is a plan view of the rear suspension of a vehicle according to the present invention.

Referring to the drawings, FIG. 1 shows a motor car 10 having front wheels 11 and rear wheels 12. The rear wheels 12 are driven from an engine (not shown), situated adjacent the front wheels 11, by way of a propeller shaft 13 (shown dotted). The propeller shaft 13 drives the rear wheels 12 by way of a differential whose casing is shown dotted at 14 and which can be seen more clearly in FIG. 4.

FIG. 2 shows, in detail, one of the rear wheels 12. The rear wheel 12 comprises a tire 15 carried by a hub 16, the hub, and thus the tire being driven by a stub axle 17. The stub axle 17 is driven from the differential 14 by a half shaft 17a having at each end a universal joint 20 (FIG. 4). A breaking mechanism 21, of known construction, is mounted on the half shaft 17a between the universal joints 20 or as shown in FIG. 2 is mounted on the stub axle 17. Alternatively the braking mechanism could be provided on the propeller shaft 13.

The stub axle 17 is journaled in an annular member 18 by two spaced-apart sets of taper-roller bearings 23. Extending radially outwardly from the annular member 18 and spaced apart by 180° are two circular section cup members 22 which may be integral with or bolted to the annular member 18. The bearings 23 allow rotation of the stub axle 17 in the annular member 18 but angular movement of the stub axle is transmitted to the annular member 18 and the cup members 22. The two cup members 22 thus lie on common axis Y—Y which intersects and is substantially perpendicular to, the axis of the stub axle 17 and the annular member 18 and which is arranged to be inclined to a vertical line X—X passing through the axis of the stub axle 17 and the annular member 18 at the same point at an angle of between 5° and 25° so as to intersect the ground behind the wheel 12 (FIG. 3).

Each cup member 22 has positioned partially therein a respective torsion bar 24 whose axis is coincident with the axis Y—Y and whose radially inner end 24a is splined to the radially inner end of its cup member 22 by splines 25.

The radially outer end 24b of each torsion bar 24 is splined by splines 26 to the inside of a respective circular-section cap member 27 integral with or bolted to an annular member 27a which encircles the annular member 18. The axes of the cap members 27 thus lie on the axis Y—Y. Each cap member 27 has a circular-section portion 28 which extends radially inwardly of the annular member 27a and which surrounds the radially outer end 31 of its respective cup member 22.

Between each portion 28 and the outer end 31 of its respective cup member 22 are disposed taper roller bearings 32. The wheel 12 may thus pivot about the axis Y—Y on the bearings 32.

The annular member 27a is fixed by bolts 33 to a trailing arm 34 in the form of wishbones shown in FIG. 4. The trailing arms 34 are pivoted from a suspension cross member 35. The sprung mass of the vehicle 10 is sprung from the trailing arms 34 by springs, such as leaf springs or coil springs, which are not shown. The suspension cross member 35 is rigidly mounted at its extremities 36 to the underbody or chassis of the vehicle 10.

The operation of the device described above is as follows. When the vehicle is subject to a lateral deflecting force, i.e., a force applied transversely to spring mass of the vehicle, such, for instance, as may be caused by a gust of wind, the front of vehicle 10 will be pushed in the direction of the deflecting force. The vehicle, therefore, will be at an angle to the intended direction of travel. The lateral deflecting force also creates a moment on the back wheels 12 acting on the vertical plane of the axis X—X which has a component of torque about the inclined axis Y—Y thus turning or steering the wheels 12 about the axis Y—Y in a direction determined by the angle between axis X—X and axis Y—Y and the torsional stiffness of the torsion bars 24. The amount of movement of the back wheels 12 is limited by the torsion bars 24, since the cap members 27 are rigidly fixed, in effect, to the vehicle body. Thus the lateral deflecting force causes the rear wheels 12 to turn or steer about the axis Y—Y passing through their center.

In addition, it will be understood that the axis of torsion bars 24, i.e., axis Y—Y, is not coincident with the vertical axis X—X passing through the center of the wheel and its point of contact with the ground. If this were not so, no effective turning moment on the wheel would be produced by any lateral deflecting force. It will be seen from FIG. 3 that the axis X—X and the axis Y—Y are substantially coplanar displaced and intersect each other at an angle $\theta$ in the midcircumferential plane of the wheel. The angle $\theta$ is, for example, between 5° and 25°; the amount of steering of the back wheels is a function of the magnitude of the angle $\theta$ together with torsion bar stiffness which may be variable and the magnitude of the lateral deflecting forces. Typically the wheels 12 may turn about 2° before engaging stops (not shown).

As shown in FIG. 3 the rear wheel 12 rotates clockwise when viewed externally of the motor vehicle 10 and the axis Y—Y is angularly spaced apart in the clockwise direction from the axis X—X, i.e., the axis Y—Y intersects the ground behind the wheel 12, thus producing understeer characteristics.

With the rear wheels 12 rotating in the same direction but with the axis Y—Y spaced apart in the anticlockwise direction from the axis X—X, i.e., the axis X—X intersects the ground in front of the wheel 12 the device will produce oversteer characteristics.

With each torsion bar 24 being retained in the cap member 27 by splines 26 respectively and in the cup member 22 by splines 25 there is a tendency for play in the splines, which may, in practice, cause "wobble" of the rear wheels 12. Hence the pair of torsion bars 24 in each wheel 12 may be given a positive preapplied tension so that the splines are always engaged and there is no play therein. The tension in the pair of torsion bars 24 is equal, in opposite directions and greater than that caused by the maximum possible deflection of the wheel, so that in operation, as the tension increases in one it decreases in the other, while the tension in one torsion bar 24 is never zero or in the same direction as the other. Thus if the wheels may turn through about 2° before engaging the stops as stated above, the prewind of the torsion bars, i.e., the predetermined tension, could be 3° so that at the limit of wheel turning one torsion bar is wound to 5° and the other is wound to 1°.

It is important that the axis Y—Y is substantially coplanar with the axis X—X since if these are spaced apart by any considerable distance then a turning moment will be generated during acceleration or braking tending to cause the wheels to turn.

Thus it will be appreciated that understeer or oversteer characteristics may be introduced as desired into the motor vehicle 10 by suitably arranging the relative intersection with the ground of the axis Y—Y behind or in front of the intersection of the axis X—X with the ground respectively.

It will be appreciated that although in the drawings two torsion bars 24 have been shown only one is absolutely necessary but if only one is provided then additional strengthening may be required.

I claim:

1. A motor vehicle having rear wheels, said rear wheels having a normal axis of rotation in a plane parallel to the ground and perpendicular to the longitudinal axis of the vehicle, a sprung mass and a suspension for the rear wheels for allowing vertical movement thereof with respect to said sprung mass, said suspension including means for allowing pivotal movement of said rear wheels about a pivoting axis perpendicular to the normal axis of rotation of the wheels, said suspension further including at least one torsion member carried in each of said rear wheels and arranged to apply a torsional force about said pivoting axis in such a manner that a force applied transversely to the sprung mass which causes pivotal movement of the wheels about said pivoting axis is opposed by the action of said torsion members.

2. A motor vehicle as claimed in claim 1 in which the at least one torsion member in said wheels is arranged in such a manner that lateral movement of the sprung mass causes pivotal movement of the wheels in a direction and to an extent which is such as to tend to counteract said force.

3. A motor vehicle as claimed in claim 1 in which the at least one torsion member is mounted in a housing comprising two relatively movable parts, the wheels being journaled in one of the parts of said housing by first bearing means which allow said wheels to rotate relative to said one part of the housing and which transmit said pivotal movement of said wheels to said one part of the housing.

4. A motor vehicle as claimed in claim 3 in which the other part of the housing is connected to the sprung mass by longitudinally extending trailing arms.

5. A motor vehicle as claimed in claim 4 in which said trailing arms are connected to a support member which is rigidly mounted on the sprung mass of the motor vehicle.

6. A motor vehicle as claimed in claim 3 in which the opposite ends of the or each said torsion member are connected to the two parts of the housing respectively by means of splines.

7. A motor vehicle as claimed in claim 6 in which said torsion members always have a positive preapplied tension to keep said splines engaged with said housing parts.

8. A suspension as claimed in claim 3 in which the two parts of said housing are supported from one another by second bearing means, said wheel being pivotal about said second bearing means.

9. A motor vehicle as claimed in claim 1 in which two torsion members are provided extending on a common axis on opposite sides of the axis of rotation of a said rear wheel.

10. A motor vehicle as claimed in claim 9 in which the common axis of said torsion members and a vertical axis extending through the axis of the wheel are substantially coplanar and intersect at an angle between 5° and 25°.

11. A motor vehicle as claimed in claim 9 in which said common axis and said vertical axis are both in the midcircumferential plane of the wheel.

12. A motor vehicle as claimed in claim 9 in which said common axis intersects the ground in advance of the said vertical axis to produce oversteer characteristics in the vehicle.

13. A motor vehicle as claimed in claim 9 in which said common axis intersects the ground in retard of the said vertical axis to produce understeer characteristics in the vehicle.

14. A motor vehicle having rear wheels, a sprung mass and a suspension for the rear wheels for allowing pivotal and vertical movement thereof with respect to the sprung mass, said suspension comprising at least one torsion member connected between said sprung mass and each rear wheel, in such a manner that a force applied transversely to the sprung mass causes pivotal movement of the wheels in a direction which is opposed by the action of the torsion members, said at least one torsion member being mounted in a housing comprising two relatively movable parts, the wheels being journaled in one of the parts of said housing by first bearing means which allow said wheels to rotate relative to said one part of the housing and which transmit said pivotal movement of said wheels to said one part of the housing, and in which the other part of the housing is connected to the sprung mass by longitudinally extending trailing arms.

15. A motor vehicle as claimed in claim 14 in which said trailing arms are connected to a support member which is rigidly mounted on the sprung mass of the motor vehicle.

16. A motor vehicle as claimed in claim 14 in which the opposite ends of the said torsion member is connected to the two parts of the housing respectively by means of splines.

17. A motor vehicle as claimed in claim 16 in which said torsion member always has a positive preapplied tension to keep said splines engaged with said housing parts.

18. A suspension as claimed in claim 14 in which said two parts of said housing are supported from one another by second bearing means, said wheels being pivotable about their respective said second bearing means.

19. A motor vehicle having rear wheels, a sprung mass and a suspension for the rear wheels for allowing pivotal and vertical movement thereof with respect to the sprung mass, said suspension comprising at least one torsion member connected between said sprung mass and each rear wheel, in such a manner that a force applied transversely to the sprung mass causes pivotal movement of the wheel in a direction which is opposed by the action of the torsion members, the said at least one torsion member in each wheel being mounted in a housing comprising two relatively moveable parts, the wheels being journaled in one of the parts of said housing by first bearing means which allow said wheels to rotate relative to said one part of the housing and which transmit said pivotal movement of said wheels to said one part of the housing, the opposite ends of each of said torsion members being connected to the two parts of the housing respectively by the use of splines.

20. A motor vehicle as claimed in claim 19 in which said torsion members always have a positive preapplied tension to keep said splines engaged with said housing parts.

21. A motor vehicle having rear wheels, a sprung mass and a suspension for the rear wheels for allowing pivotal and vertical movement thereof with respect to the sprung mass, said suspension comprising at least one torsion member connected between said sprung mass and each rear wheel, in such a manner that a force applied transversely to the sprung mass causes pivotal movement of the wheel in a direction which is opposed by the action of the torsion members, the said at least one torsion member in each wheel being mounted in a housing comprising two relatively moveable parts, the wheels being journaled in one of the parts of said housing by first bearing means which allow said wheels to rotate relative to said one part of the housing and which transmit said pivotal movement of said wheels to said one part of the housing, the two parts of said housing being supported from one another by second bearing means, said wheel being pivotal about said second bearing means.

* * * * *